(12) United States Patent
Choi et al.

(10) Patent No.: US 9,808,871 B2
(45) Date of Patent: Nov. 7, 2017

(54) CUTTING INSERT

(71) Applicant: KORLOY INC., Seoul (KR)

(72) Inventors: Byung-Sun Choi, Cheongju-si (KR);
Sun-Kyoo Lee, Cheongju-si (KR);
Taeg-Won Lee, Cheongju-si (KR);
Dong-Ryong Ji, Cheongju-si (KR);
Dong-Bok Park, Cheongju-si (KR)

(73) Assignee: KORLOY INC., Seoul (KR)

(*) Notice: Subject to any disclaimer, the term of this patent is extended or adjusted under 35 U.S.C. 154(b) by 252 days.

(21) Appl. No.: 14/650,489

(22) PCT Filed: Apr. 29, 2013

(86) PCT No.: PCT/KR2013/003663
§ 371 (c)(1),
(2) Date: Jun. 8, 2015

(87) PCT Pub. No.: WO2014/104489
PCT Pub. Date: Jul. 3, 2014

(65) Prior Publication Data
US 2015/0306687 A1 Oct. 29, 2015

(30) Foreign Application Priority Data
Dec. 28, 2012 (KR) .................. 10-2012-0156491

(51) Int. Cl.
*B23C 5/20* (2006.01)
*B23C 5/22* (2006.01)

(52) U.S. Cl.
CPC .......... *B23C 5/2213* (2013.01); *B23C 5/2226* (2013.01); *B23C 5/202* (2013.01);
(Continued)

(58) Field of Classification Search
CPC ......... B23C 5/109; B23C 5/207; B23C 5/202; B23C 2200/128; B23C 2200/367;
(Continued)

(56) References Cited

U.S. PATENT DOCUMENTS 3,636,602 A * 1/1972 Owen ..................... B23C 5/207
407/113
3,701,187 A * 10/1972 Erkfritz .................. B23C 5/207
407/113
(Continued)

FOREIGN PATENT DOCUMENTS

CN 102264495 A 11/2011
JP 2010-280056 A 12/2010
(Continued)

*Primary Examiner* — Sunil K Singh
*Assistant Examiner* — Ryan Rufo
(74) *Attorney, Agent, or Firm* — Rabin & Berdo, P.C.

(57) ABSTRACT

The objective of the present invention is to provide a cutting insert which reduces cutting load and can be accurately positioned at a coupling part of a cutting tool even if cutting edges are broken or deformed. To this end, the cutting insert of the present invention includes an upper surface, a lower surface, a plurality of lateral surfaces connecting the upper surface with the lower surface, and a plurality of upper cutting edges formed between the plurality of lateral surfaces and the upper surface. In addition, the cutting insert coupled with the coupling part of the cutting tool includes: first and second upper cutting load reducing portions formed on the upper surface and provided at each side coming in contact with first and second upper cutting edges of the plurality of upper cutting edges facing each other so as to reduce the cutting load; and a one side position setting portion provided on a first lateral surface of the plurality of lateral surfaces not coming in contact with the first and
(Continued)

second upper cutting edges so as to set the position of the cutting insert in the coupling part.

12 Claims, 10 Drawing Sheets

(52) U.S. Cl.
CPC ...... *B23C 5/207* (2013.01); *B23C 2200/0433* (2013.01); *B23C 2200/0477* (2013.01); *B23C 2200/085* (2013.01); *B23C 2200/128* (2013.01); *B23C 2200/367* (2013.01); *B23C 2210/168* (2013.01); *B23C 2210/66* (2013.01)

(58) Field of Classification Search
CPC ........ B23C 2200/121; B23C 2200/361; B23C 2200/0416; B23C 2200/0494
See application file for complete search history.

(56) References Cited

U.S. PATENT DOCUMENTS

| | | | | |
|---|---|---|---|---|
| 3,716,900 A | * | 2/1973 | Erkfritz | B23C 5/2213 407/100 |
| 3,875,631 A | * | 4/1975 | Malinchak | B23C 5/207 407/113 |
| 4,140,431 A | * | 2/1979 | Friedline | B23C 5/207 407/114 |
| 4,531,864 A | * | 7/1985 | Bylund | B23C 5/109 407/114 |
| 4,681,486 A | | 7/1987 | Hale | |
| 8,419,320 B2 | | 4/2013 | Sung et al. | |
| 2009/0129874 A1 | * | 5/2009 | Craig | B23C 5/109 407/42 |
| 2009/0245950 A1 | * | 10/2009 | Tanaka | B23C 5/207 407/48 |
| 2011/0164932 A1 | * | 7/2011 | Choi | B23C 5/06 407/40 |
| 2011/0170963 A1 | * | 7/2011 | Smilovici | B23C 5/06 407/42 |
| 2012/0034041 A1 | | 2/2012 | Koga | |
| 2012/0039675 A1 | * | 2/2012 | Men | B23C 5/109 407/40 |
| 2012/0308317 A1 | | 12/2012 | Choi et al. | |

FOREIGN PATENT DOCUMENTS

| | | |
|---|---|---|
| KR | 10-2003-0091032 A | 12/2003 |
| KR | 10-2010-0081593 A | 7/2010 |
| KR | 10-2010-0122843 A | 11/2010 |
| KR | 10-2011-0095749 A | 8/2011 |

* cited by examiner

VIEW-odd (Upper surface coupling)

CUTTING INSERT

TECHNICAL FIELD

The invention relates to a cutting insert.

BACKGROUND ART

Generally, a cutting insert is used for cutting a workpiece material consisting of iron, nonferrous metal, non-metallic material, etc., while being coupled with a cutting tool mounted to a machine tool.

Such cutting insert generally has an upper surface, a lower surface, and a plurality of lateral surfaces connecting the upper surface and the lower surface. An upper cutting edge is provided between the lateral surfaces and the upper surface, and a lower cutting edge is provided between the lateral surfaces and the lower surface.

As a related art, Korean Registered Patent No. 10-1145491 discloses a cutting insert as illustrated in FIGS. 9 and 10, which is provided with a plurality of grooves 13$a$, 13$b$, 13$c$ formed on lateral surfaces to not only reduce cutting load, but also prevent common use of the cutting edges in the same shape for odd-numbered and even-numbered coupling parts 2 of the cutting tool. Such plurality of grooves divide the upper cutting edge 11' and the lower cutting edge 11" into a plurality of elements 11$a$', 11$b$', 11$c$', 11$d$', 11$a$", 11$b$", 11$c$", 11$d$" to induce efficient release of the chips, to minimize contact area with the workpiece material, and to position the cutting insert 10 with accuracy by being inserted into a plurality of position projections 113$a$, 113$b$, 113$c$ formed on the coupling part 2 of the cutting tool so as to prevent common use with the odd- and even-numbered coupling parts 2.

Meanwhile, when one side of the upper cutting edge 11' is broken or deformed during processing, this will result in breakage or deformation of the plurality of grooves 13$a$, 13$b$, 13$c$, in which case the plurality of position projections 113$a$, 113$b$, 113$c$ cannot be inserted into the plurality of grooves 13$a$, 13$b$, 13$c$ as these are broken or deformed. Accordingly, the cutting insert has to be disposed of, even when all the sides of the lower cutting edge 11" and the rest sides of the upper cutting edge 11' are still in good condition for use.

DISCLOSURE OF INVENTION

Technical Problem

Accordingly, an objective of the present disclosure is to provide a cutting insert which is able to not only reduce cutting load, but also be positioned accurately in a coupling part of a cutting tool even when a cutting edge is broken or deformed.

Solution to Problem

According to an embodiment, a cutting insert includes an upper surface, a lower surface, a plurality of lateral surfaces connecting the upper surface with the lower surface, and a plurality of upper cutting edges formed between the plurality of lateral surfaces and the upper surface, in which the cutting insert is coupled with a coupling part of a cutting tool and includes first and second upper cutting load reducing portions formed on the upper surface and provided at each side coming in contact with first and second upper cutting edges facing each other among the plurality of upper cutting edges, so as to reduce the cutting load;

and an one-side position setting portion provided on a first lateral surface of the plurality of lateral surfaces, in which the first lateral surface is not coming in contact with the first and second upper cutting edges, so as to set the position of the cutting insert in the coupling part.

The first upper cutting load reducing portion may include at least one upper one-side nick which is formed on the first upper cutting edge of the upper surface and elongated in a direction toward the second upper cutting edge, and the second upper cutting load reducing portion comprises at least one upper other-side nick which is formed on the second upper cutting edge of the upper surface and elongated in a direction toward the first upper cutting edge. The at least one upper one-side nick and the at least one upper other-side nick may be set in numbers different from each other.

The at least one upper one-side nick may include a first upper one-side nick, and the at least one upper other-side nick may include a first upper other-side nick and a second upper other-side nick, and when a first imaginary line is drawn from the first upper one-side nick lengthwise to the second upper cutting edge, the first imaginary line may be positioned between the first and second upper other-side nicks.

The cutting insert may additionally include a plurality of lower cutting edges formed between the plurality of lateral surfaces and the lower surface; and a first lower cutting load reducing portion and a second lower cutting load reducing portion formed on the lower surface and on sides coming in contact with a first lower cutting edge and a second lower cutting edge among the plurality of lower cutting edges, in which the first and second cutting edges are facing each other, so as to reduce cutting load.

The first and second upper cutting load reducing portions and the upper surface having the same may be in a 180-degree rotational symmetry with the first and second lower cutting load reducing portions and the lower surface having the same, with reference to a center shaft connecting a center point of the first lateral surface with a center point of an opposite surface to the first lateral surface.

The one-side position setting portion may include a first one-side position setting groove formed on an upper portion of the first lateral surface; and a second one-side position setting groove formed on a lower portion of the first lateral surface, in which the first one-side position setting groove and the second one-side position setting groove may be eccentric to each other and may be in a 180-degree rotational symmetry with each other with reference to a center point of the first lateral surface.

The cutting insert may additionally include an other-side position setting portion formed on a second lateral surface among the plurality of lateral surfaces, in which the second lateral surface is not coming into contact with the first and second upper cutting edges and is opposed to the first lateral surface, so as to set the position of the cutting insert in the coupling part, and the other-side position setting portion may have an identical shape as a diagonal-symmetric shape of the one-side position setting portion with reference to the center point of the first lateral surface.

Advantageous Effects of Invention

As described above, the cutting insert according to embodiments of the present invention can provide the following effects.

According to the embodiments, an upper cutting load reducing portion and an one-side position setting portion are formed on separate surfaces, i.e., formed on upper and lateral surfaces, so that it is possible to not only reduce the cutting load through the upper cutting load reducing portion, but also position the cutting insert accurately in a coupling part of the cutting tool through the one-side position setting portion, even when an upper edge is broken or deformed.

Further, according to the embodiments of the present invention, a lower cutting load reducing portion and an other-side position setting portion are provided on separate surfaces, i.e., provided on upper and lateral surfaces so that it is possible to not only reduce the cutting load through the lower cutting load reducing portion, but also position the cutting insert accurately at a coupling part of the cutting tool through the other-side position setting portion, even when a lower edge is broken or deformed.

Further, according to the embodiments of the present invention, a first upper cutting load reducing portion and a second upper cutting load reducing portion, and an upper surface having the first and second upper cutting load reducing portions are in a 180-degree rotational symmetry with a first lower cutting load reducing portion and a second lower cutting load reducing portion and a lower surface having the first and second lower cutting load reducing portions, with reference to a center shaft connecting a center point of the first lateral surface and a center point of an opposite surface to the first lateral surface, in which a first one-side position setting groove and a second one-side position setting groove are eccentric to each other and are in a 180-degree rotational symmetry with reference to the center point of the first lateral surface, such that a first upper cutting edge (i.e., an upper cutting edge provided on the first upper cutting load reducing portion) and a first lower cutting edge (i.e., lower cutting edge provided on the first lower cutting load reducing portion), and a second upper cutting edge (i.e., upper cutting edge provided on the second upper cutting load reducing portion) and a second lower cutting edge (i.e., lower cutting edge provided on the second lower cutting load reducing portion) are commonly used, while the first upper cutting edge and the second lower cutting edge, and the second upper cutting edge and the first lower cutting edge, each of which are in different shapes, are not allowed for common use. As a result, accurate coupling with odd-numbered coupling parts (or, even-numbered coupling parts) of the cutting tool is allowed, i.e., without a possibility that cutting edges of different shapes are used instead. That is, the cutting edges in the same shape can always be coupled with odd-numbered coupling parts (or even-numbered coupling parts) with the same orientation, while incomplete coupling can prevent undesirable possibility that the cutting edge of different shape is coupled with the odd-numbered coupling parts (or even-numbered coupling parts).

Further, according to embodiments of the present invention, the shape of the other-side position setting portion is identical to a shape that is in diagonal symmetry with reference to the center point of the first lateral surface, which accordingly allows only the one-side position setting portion to be coupled with the odd-numbered coupling part (or even-numbered coupling part) of the cutting tool, while, on the contrary, allowing only the other-side position setting portion to be coupled with the even-numbered coupling part (or odd-numbered coupling part) of the cutting tool, thereby preventing common use of the cutting edges of different shapes with one coupling part.

BRIEF DESCRIPTION OF DRAWINGS

The above and/or other aspects and advantages of the present invention will become apparent and more readily appreciated from the following detailed description, taken in conjunction with the accompanying drawings of which.

BEST MODE FOR CARRYING OUT THE INVENTION

The embodiments will be explained in greater detail below with reference to the drawings to enable those with ordinary skill in the art to easily embody the invention. However, it should be noted that the invention can be implemented in a variety of configurations, and not to be limited to those described herein.

Figure 1:
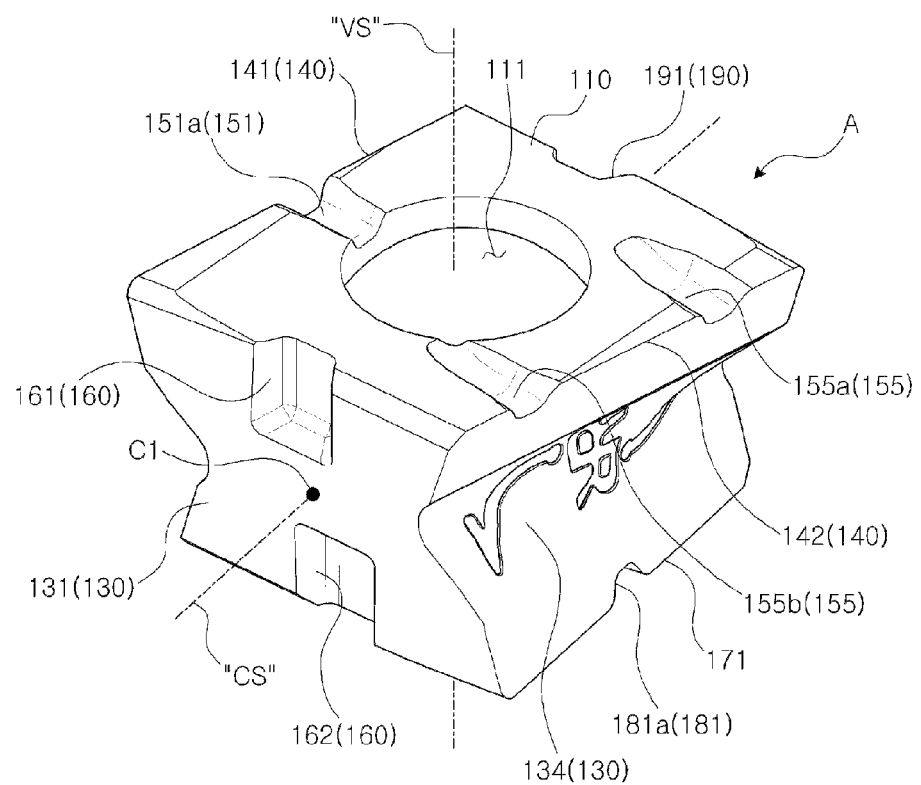
FIG. 1 is a perspective view of a cutting insert according to an embodiment of the present invention.
Figure 2:
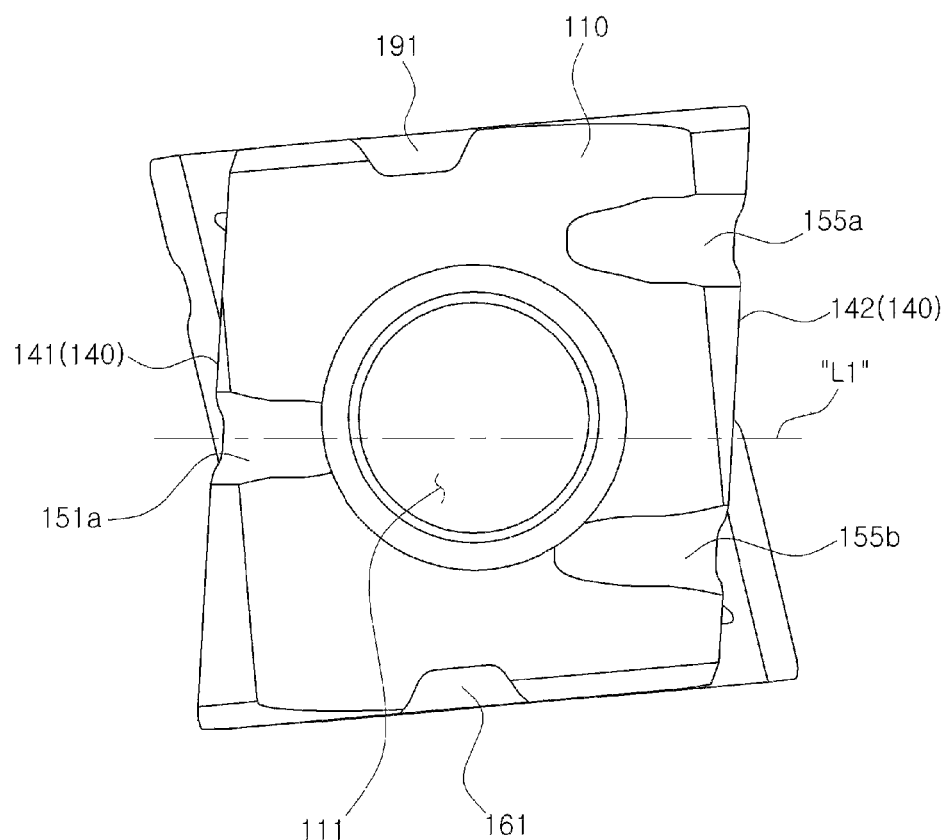
FIG. 2 is a plan view of the cutting insert of FIG. 1 seen from above.
Figure 3:
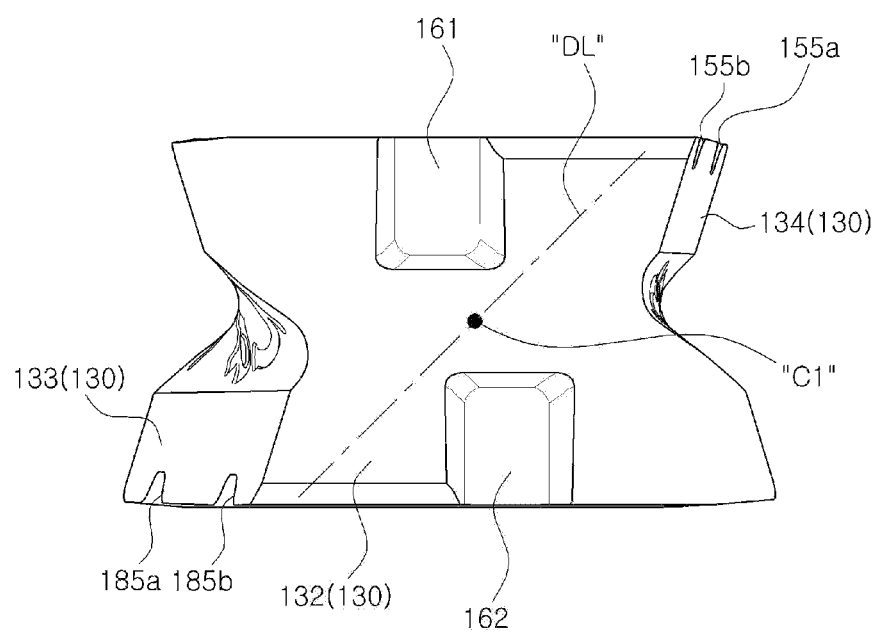
FIG. 3 is a front view of the cutting insert of FIG. 1.
Figure 4:
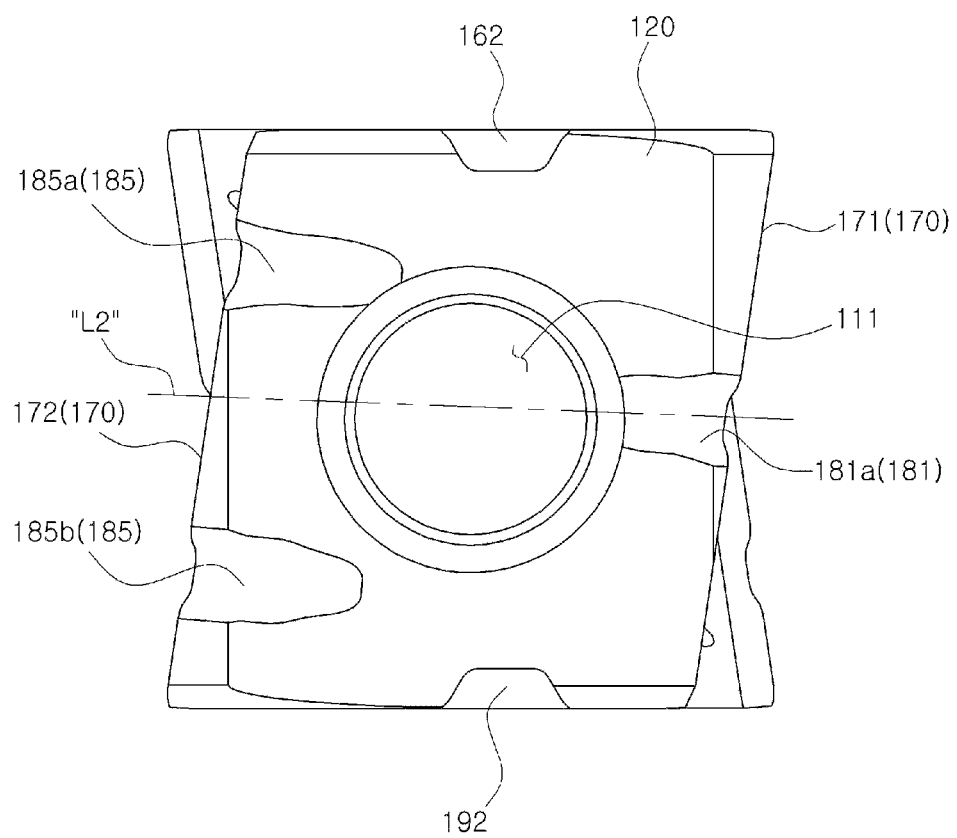
FIG. 4 is a bottom view of the cutting insert of FIG. 1 seen from below.
Figure 5:
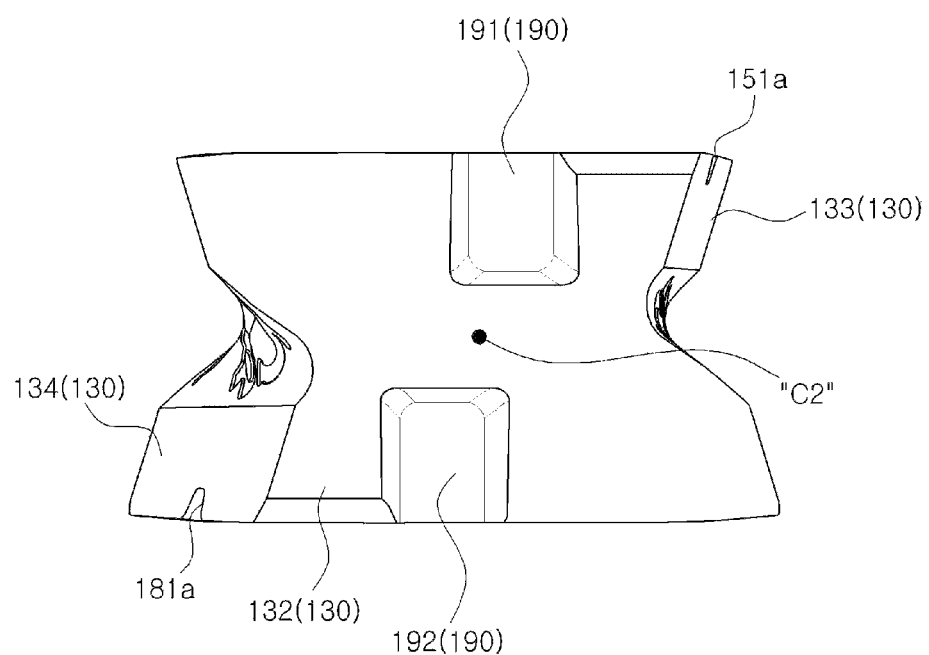
FIG. 5 is a rear view of the cutting insert of FIG. 1.

FIG. 1 is a perspective view of a cutting insert according to an embodiment of the present invention, FIG. 2 is a plan view of the cutting insert of FIG. 1 seen from above, FIG. 3 is a front view of the cutting insert of FIG. 1, FIG. 4 is a bottom view of the cutting insert of FIG. 1 seen from below, and FIG. 5 is a rear view of the cutting insert of FIG. 1.

Figure 6:
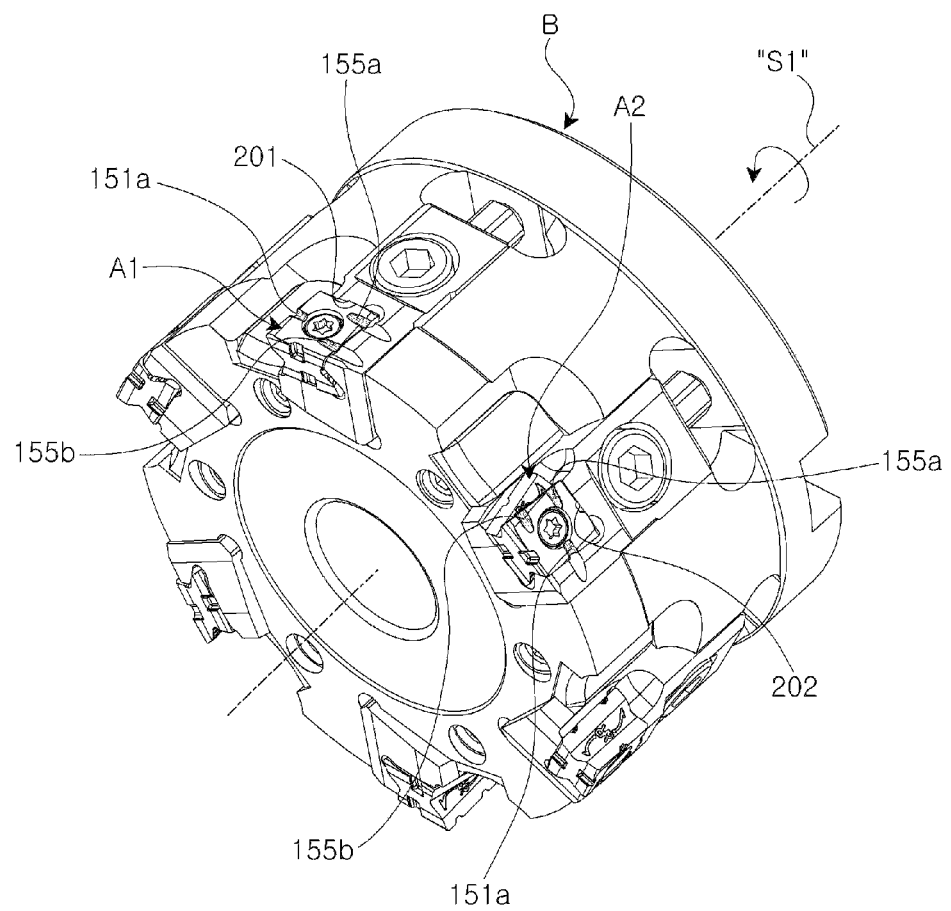
FIG. 6 is a perspective view illustrating a cutting tool on which a cutting insert according to an embodiment of the present invention is mounted.
Figure 7:
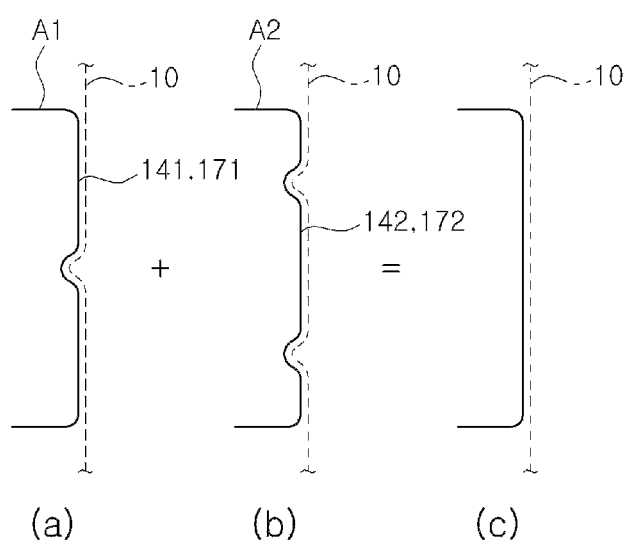
FIG. 7 is a diagram schematically illustrating interrelated characteristics of a first upper cutting load reducing portion of the first cutting insert of FIG. 6, and a second upper cutting load reducing portion of the second cutting insert of FIG. 6.
Figure 8:
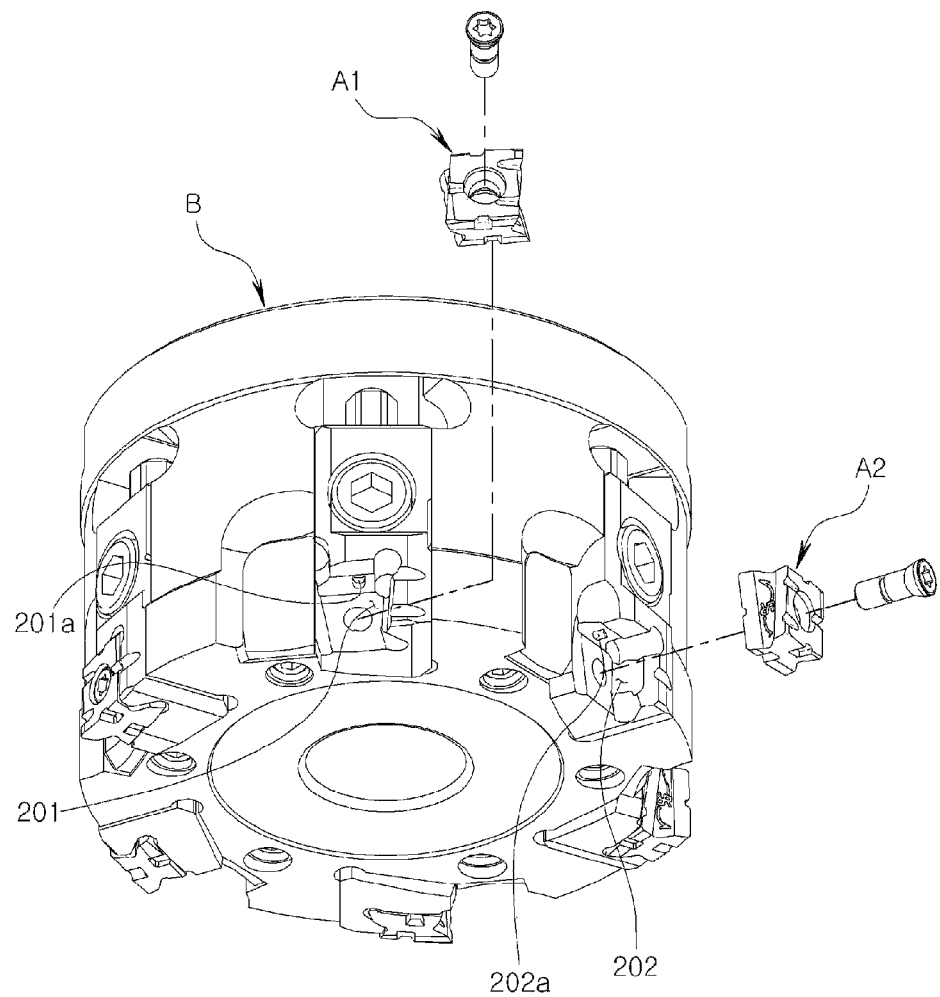
FIG. 8 is a perspective view illustrating a cutting insert according to an embodiment of the present invention being mounted on a coupling part of a cutting tool.
Figure 9:
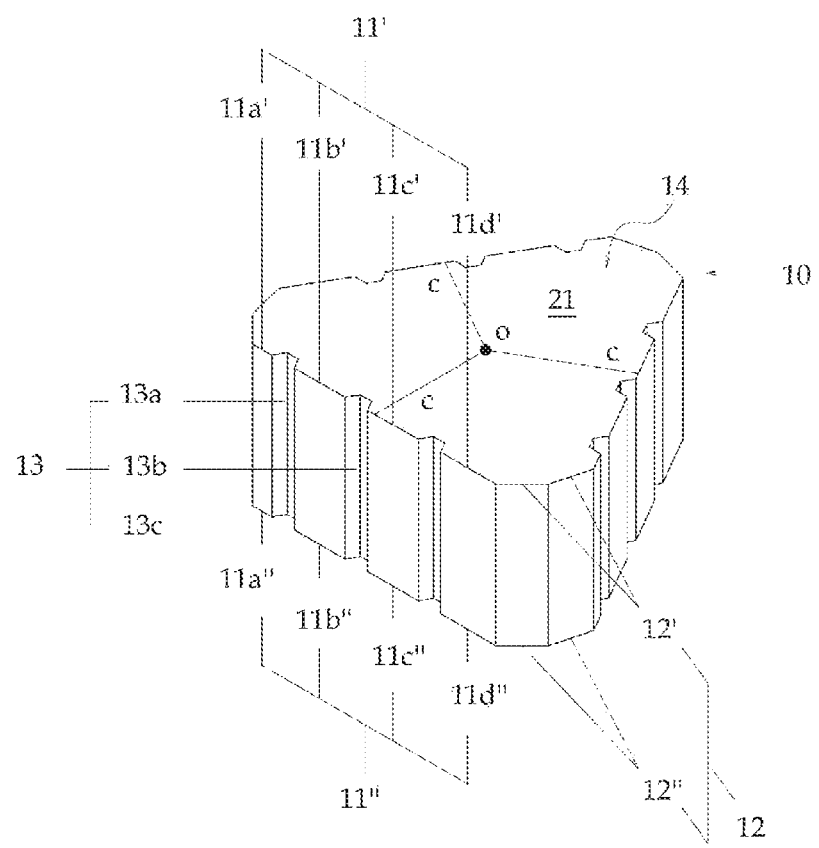
FIG. 9 is a diagram illustrating a related art cutting insert.
Figure 10:
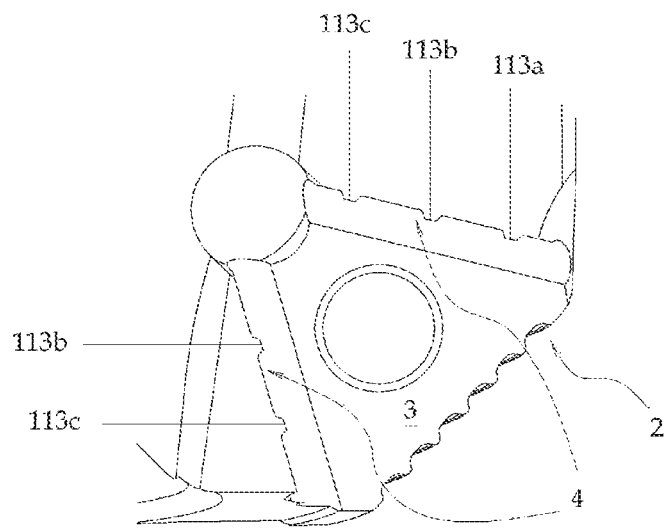
FIG. 10 is a plan view, seen vertically from the bottom, of a coupling part of a cutting tool to be coupled with the related art cutting insert.

FIG. 6 is a perspective view illustrating a cutting tool on which a cutting insert according to an embodiment of the present invention is mounted, FIG. 7 is a diagram schematically illustrating interrelated characteristics of a first upper cutting load reducing portion of the first cutting insert of FIG. 6, and a second upper cutting load reducing portion of the second cutting insert of FIG. 6, and FIG. 8 is a perspective view illustrating a cutting insert according to an embodiment of the present invention being mounted on a coupling part of a cutting tool.

According to an embodiment of the present invention, a cutting insert A is coupled with a coupling part 201 of a cutting tool B (e.g., milling cutter), and includes an upper surface 110, a lower surface 120, a plurality of lateral surfaces 130 connecting the upper surface 110 and the lower surface 120, and a plurality of upper cutting edges 140 provided between the plurality of lateral surfaces 130 and the upper surface 110.

As illustrated in FIGS. 1, 2 and 4, the upper surface 110 and the lower surface 120 may have an approximately trapezoidal shape, but not limited thereto. Further, the upper surface 110 and the lower surface 120 may be so formed as to be twisted at a predetermined angle with respect to each other, with reference to a vertical shaft (VS) passed through a coupling hole 111. Moreover, the upper surface 110 and the lower surface 120 may be in a 180-degree rotational symmetry with each other, with reference to a center point C1 of a first lateral surface 131 (e.g., a front surface in FIG. 1) among a plurality of lateral surfaces 130.

As illustrated in FIG. 1 and by referring to FIG. 1, the plurality of lateral surfaces 130 may include the first lateral surface 131 corresponding to the front surface, and a second lateral surface 132 (132 in FIG. 5) corresponding to a rear surface. Further, the upper and lower portions of the first lateral surface 131 may be in a 180-degree rotational symmetry with each other with reference to a center point (C1 in FIG. 3) of the first lateral surface 131, and the upper and lower portions of the second lateral surface 132 may be in 180-degree rotational symmetry with each other with reference to a center point (C2 in FIG. 5) of the second lateral surface 132. Moreover, as illustrated in FIG. 1 and by referring to FIG. 1, the plurality of lateral surfaces 130 may additionally include a third lateral surface 133 (133 in FIG. 3) corresponding to a left lateral surface, and a fourth lateral surface 134 corresponding to a right lateral surface.

The plurality of upper cutting edges 140 are substantially those portions that cut the workpiece material ('10' in FIG. 7), and these may include a first upper cutting edge 141 provided between the upper surface 110 and the third lateral surface 133, and a second upper cutting edge 142 provided between the upper surface 110 and the fourth lateral surface 134. Further, the first and second upper cutting edges 141, 142 may be faced to each other in parallel.

Additionally, the cutting insert A according to an embodiment of the present invention may include a first upper cutting load reducing portion 151 and a second upper cutting load reducing portion 155, and an one-side position setting portion 160, as illustrated in FIGS. 1 through 5.

Referring first to FIGS. 1 and 2, the first and second upper cutting load reducing portions 151, 155 will be described.

The first and second upper cutting load reducing portions 151, 155 may be provided on an upper surface, i.e., provided on the sides that come into contact with the first and second upper cutting edges 141, 142, to reduce cutting load.

Specifically, the first upper cutting load reducing portion 151 may be specifically formed on the first upper cutting edge 141 on the upper surface 110, and include at least one upper one-side nick which is elongated in a direction toward the second upper cutting edge 142. As an example of the at least one upper one-side nick, there may be only one upper one-side nick 151a as illustrated in FIGS. 1 and 2, but embodiments are not limited thereto. Accordingly, a plurality of upper one-side nicks may be formed.

The second upper cutting load reducing portion 155 may be formed specifically on the second upper cutting edge 142 on the upper surface 110, and include at least one upper other-side nick which is elongated in a direction toward the first upper cutting edge 141. As an example of the at least one upper other-side nick, there may be two upper other-side nicks 155a, 155b as illustrated in FIGS. 1 and 2, but embodiments are not limited thereto. Accordingly, two or more upper other-side nicks may be formed, as long as these are in number that is different from the number of the at least one upper one-side nick described above.

Hereinbelow, the first and second upper cutting load reducing portions 151, 155 will be described in detail with reference to FIGS. 1 and 2.

For example, the first upper cutting load reducing portion 151 may include the first upper one-side nick 151a, and the second upper cutting load reducing portion 155 may include the first and second upper other-side nicks 155a, 155b. Specifically, when a first imaginary line (L1 in FIG. 2) is drawn from the first upper one-side nick 151a in a lengthwise direction thereof to the second upper cutting edge 142, the first imaginary line (L1 in FIG. 2) may be positioned between the first and second upper other-side nicks 155a, 155b.

Accordingly, as illustrated in FIG. 6, the first cutting insert A1 is coupled with a first coupling part 201 of the cutting tool B, in which the first and second upper other-side nicks 155a, 155b of the first cutting insert A1 are coupled in contact with one surface of the first coupling part 201. The second cutting insert A2 is coupled with the second coupling part 202 of the cutting tool, in which the first upper one-side nick 151a of the second cutting insert A2 is coupled in contact with one surface of the second coupling part 202. In this situation, that is, in a situation that the first upper cutting edge 141 of the first cutting insert A1 that has the first upper one-side nick 151a formed therein, and the second upper cutting edge 142 of the second cutting insert A2 that has the first and second upper other-side nicks 155a, 155b therein are respectively arranged in positions to cut the workpiece material 10, the cutting tool B is rotated counter-clockwise with reference to the center shaft (S1 of FIG. 6) of the rotation. As a result, certain portion (see portion (a) in FIG. 7) is remained uncut due to the presence of the first upper one-side nick 151a of the first upper cutting edge 141 of the first cutting insert A1, but then is cut (see portion (b) in FIG. 7) by the second upper cutting edge 142 of the second cutting insert A2. Accordingly, the cut portion of the workpiece material 10 can maintain a linear configuration (see portion (c) in FIG. 7).

Moreover, during cutting of the workpiece material 10, the first upper cutting edge 141 can have reduced cutting load due to the first upper one-side nick 151a, and the second upper cutting edge 142 can have reduced cutting load due to the first and second upper other-side nicks 155a, 155b.

Hereinbelow, the one-side position setting portion 160 described above will be further explained with reference to FIGS. 1 and 3.

The one-side position setting portion 160 is provided on the first lateral surface 131 among the plurality of lateral surfaces, in which the first lateral surface 131 is not in contact with the first and second upper cutting edges 141, 142. The one-side position setting portion 160 plays a role of setting the position of the cutting insert A in the coupling part (201 in FIG. 8) of the cutting tool (B in FIG. 8).

Specifically, the one-side position setting portion 160 may include a first one-side position setting groove 161 formed on an upper portion of the first lateral surface 131, and a second one-side position setting groove 162 formed on a lower portion of the first lateral surface 131. Specifically, the first and second one-side position setting grooves 161, 162 may be formed eccentrically to each other, and in a 180-degree rotational symmetry with each other with reference to the center point (C1 in FIG. 3) of the first lateral surface 131.

Accordingly, even if the first upper cutting edge 141 is worn out, the first lower cutting edge 171, which will be explained below, can still be used, because it is possible to remove the first one-side position setting groove 161 inserted in the coupling projection (201a in FIG. 8) formed on the coupling part (201 in FIG. 8) of the cutting tool (B in FIG. 8), rotate the cutting insert A by 180 degrees with reference to the center point (C1 in FIG. 3) of the first lateral surface 131, and insert the second one-side position setting groove 162 into the coupling projection (201a in FIG. 8).

Additionally, the cutting insert A according to the embodiment of the present invention described above may additionally include an other-side position setting portion 190, as illustrated in FIG. 5.

The other-side position setting portion 190 is provided on a second lateral surface 132 among the plurality of lateral surfaces 130, in which the second lateral surface 132 is not in contact with the first and second upper cutting edges 141, 142 and is opposed to the first lateral surface 131. The other-side position setting portion 190 plays a role of setting the position of the cutting insert A in the coupling part (201 in FIG. 8) of the cutting tool (B in FIG. 8).

Specifically, the other-side position setting portion 190 may have the same shape as that of a symmetric shape of the one-side positions setting portion 160 described above, relative to a diagonal line (DL in FIG. 3), and with reference to the center point (C1 in FIG. 3) of the first lateral surface 131. That is, if the other-side position setting portion 190 includes a first other-side position setting groove 191 formed on an upper portion of the second lateral surface 132 and a second other-side position setting groove 192 formed on a lower portion of the second lateral surface 132, the positions of the first and second other-side position setting grooves 191, 192 may be identical to the diagonal symmetric positions of the first and second one-side position setting grooves 161, 162 described above, with reference to the center point (C1 of FIG. 3) of the first lateral surface 131.

Accordingly, as illustrated in FIG. 8, it is assumed that the coupling projection 201a of the first coupling part 201 of the cutting tool B is so formed as to be inserted exclusively into the second one-side position setting groove 162 described above, and the coupling projection 202a of the second coupling part 202 of the cutting tool B is so formed as to be inserted exclusively into the second other-side position setting groove 192. In this situation, rotating the cutting insert A by 180 degrees with reference to the vertical shaft VS passed through the coupling hole 111, and aligning the second lateral surface 132 having the second other-side position setting portion 190 therewith to face the first coupling part 201 will not allow the other-side position setting groove 192 to be inserted into the coupling projection (201a in FIG. 8) of the first coupling part 201. This will ultimately allow only the first upper cutting edge 141 (or only the first lower cutting edge 171 to be described below) to be used for cutting the workpiece material 10, and prevent common use of the first and second upper cutting edges 141, 142 or common use of the first and second lower cutting edges 171, 172 with the first coupling part 201 of the cutting tool B. Accordingly, as illustrated in FIG. 6, the first cutting insert A1 is coupled with the odd-numbered (or even-numbered) coupling part (see 201) in a manner in which the first upper cutting edge 141 (or first lower cutting edge 171 to be described below) is exposed outside, and the second cutting insert A2 is coupled with the even-numbered (or odd-numbered) coupling part (see 202) in a manner in which the second upper cutting edge 142 (or the second lower cutting edge 172 to be described below) is exposed outside. As a result, it is possible to not only induce linear processing (see 10 in FIG. 7c) of the workpiece material 10 during rotation of the cutting tool B, but also reduce cutting load.

Furthermore, although not illustrated, it is possible to rotate the first cutting insert A1 by 180 degrees with reference to the vertical shaft VS described above and couple with the second coupling part 202 of the cutting tool B, to thus use the second upper cutting edge of the first cutting insert A1.

Moreover, the cutting insert A according to an embodiment of the present invention may additionally include a plurality of lower cutting edges 170, and a first lower cutting load reducing portion 181 and a second lower cutting load reducing portion 185.

The plurality of lower cutting edges 170 are substantially those portions that cut the workpiece material 10, and may include a first lower cutting edge 171 provided between a lower surface 120 and a fourth lateral surface 134, and a second lower cutting edge 172 provided between the lower surface 120 and a third lateral surface 133. Further, the first and second lower cutting edges 171, 172 may be facing each other in parallel.

The first and second lower cutting load reducing portions 181, 185 may be provided on the lower surface 120, and for the purpose of cutting load reduction, may be provided particularly on sides that come into contact with the first and second lower cutting edges 171, 172.

Specifically, the first and second upper cutting load reducing portions 151, 155 and the upper surface 110 having the same may be in a 180-degree rotational symmetry with the first and second lower cutting load reducing portions 181, 185 and the lower surface 120 having the same, with reference to a center shaft (CS in FIG. 1) connecting the center point (C1 in FIG. 3) of the first lateral surface 131 and the center point (C2 in FIG. 5) of the second lateral surface 132.

Accordingly, when the first upper cutting edge 141 (or the second upper cutting edge 142) is worn out, it is possible to rotate it by 180 degrees with reference to the center shaft (CS in FIG. 1) described above to use the first lower cutting edge 171 (or second lower cutting edge 172). As described above, because the first one-side position setting groove 161 and the second one-side position setting groove 162 are eccentric with each other and are in a 180-degree rotational symmetric with reference to the center point C1 of the first lateral surface 131, it is impossible to commonly use the first upper cutting edge with the second lower cutting edge 171, or the second upper cutting edge 142 and the first lower cutting edge 172, which are in different shapes. Accordingly, intended cutting edge can be accurately coupled with the odd-numbered coupling part (see 201) (or even-numbered coupling part (see 202) of the cutting tool B, without having possibility of commonly using the cutting edges of different shapes. That is, the cutting edges with the same shape are always coupled with the odd-numbered coupling part (see 201) (or even-numbered coupling part (see 202) with constantly the same orientation, while incomplete coupling prevents coupling of the cutting edge of different shape with the odd-numbered coupling part (see 201) (or even-numbered coupling part (see 202).

Hereinbelow, the first and second lower cutting load reducing portions 181, 185 described above will be explained in greater detail by referring back to FIGS. 1 and 4.

Specifically, the first lower cutting load reducing portion 181 may include at least one lower one-side nick which is formed on the first lower cutting edge 171 of the lower surface 120 and is elongated in a direction toward the second lower cutting edge 172. FIG. 4 illustrates one single lower one-side nick 181a as an example of the at least one lower one-side nick, but embodiment is not limited to any specific example. For example, there may be a plurality of lower one-side nicks.

The second lower cutting load reducing portion 185 may include at least one lower other-side nick which is formed on the second lower cutting edge 172 of the lower surface 120, and is elongated in a direction toward the first lower cutting edge 171. FIG. 4 illustrates two lower other-side nicks 185*a*, 185*b* as an example of the at least one lower other-side nick, but embodiment is not limited to any specific example. For example, there may be two or more lower other-side nicks, provided that the number thereof is different from the number of the at least one lower one-side nicks.

Hereinbelow, the first and second lower cutting load reducing portions 181, 185 described above will be explained in greater detail with reference to FIGS. 1 and 2.

For example, the first lower cutting load reducing portion 181 may include a first lower one-side nick 181*a*, and the second lower cutting load reducing portion 185 may include a first lower other-side nick 185*a* and a second lower other-side nick 185*b*. Specifically, when a second imaginary line L2 is drawn from the first lower one-side nick 181*a* lengthwise to the second lower cutting edge 172, the second imaginary line L2 may be positioned between the first and second lower other-side nicks 185*a*, 185*b*.

Accordingly, as illustrated in FIG. 7, uncut portion of the workpiece material 10, which is remained uncut at the first lower one-side nick 181*a* of the first lower cutting edge 171 of the first cutting insert A1 (see portion (a) in FIG. 7) is cut with the second lower cutting edge 172 of the second cutting insert A2 (see portion (b) in FIG. 7). As a result, the final configuration of the cut portion of the workpiece material 10 can be maintained linear (see portion (c) in FIG. 7).

Moreover, while the workpiece material 10 is being cut, the first lower cutting edge 171 can have reduced cutting load due to the first lower one-side nick 181*a*, and the second lower cutting edge 172 can have reduced cutting load due to the first and second lower other-side nicks 185*a*, 185*b*.

As described above, the cutting insert A according to an embodiment of the present invention can have the following effects.

According to an embodiment of the present invention, the upper cutting load reducing portions 151, 155 and the one-side position setting portion 160 are provided on separate surfaces, i.e., on upper surface 110 and lateral surface 130. Accordingly, the upper cutting load reducing portions 151, 155 reduce the cutting load, and the one-side position setting portion 160 can accurately position the cutting insert A in the coupling part 201 of the cutting tool B even when the upper cutting edge 140 is broken or deformed.

Further, according to an embodiment of the present invention, the lower cutting load reducing portions 181, 185 and the other-side position setting portion 190 are provided on separate surfaces, i.e., on upper surface 110 and lateral surface 130. Accordingly, the lower cutting load reducing portions 181, 185 reduce the cutting load, and the one-side position setting portion 160 or the other-side position setting portion 190 can accurately position the cutting insert A in the coupling part 201 of the cutting tool B even when the lower cutting edge 170 is broken or deformed.

The foregoing exemplary embodiments and advantages are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

INDUSTRIAL APPLICABILITY

The present invention is applicable a cutting insert for processing industrial mechanic components or the like.

The invention claimed is:

1. A cutting insert, comprising:
    an upper surface, a lower surface, a plurality of lateral surfaces connecting the upper surface with the lower surface, and a plurality of upper cutting edges formed between the plurality of lateral surfaces and the upper surface, the cutting insert being coupled with a coupling part of a cutting tool and comprising first and second upper cutting load reducing portions formed on the upper surface and provided at each side coming in contact with first and second upper cutting edges facing each other among the plurality of upper cutting edges, so as to reduce the cutting load; and
    an one-side position setting portion provided on a first lateral surface of the plurality of lateral surfaces, in which the first lateral surface is not coming in contact with the first and second upper cutting edges, so as to set the position of the cutting insert in the coupling part, the one-side position setting portion comprising:
        a first one-side position setting groove formed on an upper portion of the first lateral surface; and
        a second one-side position setting groove formed on a lower portion of the first lateral surface, wherein the first one-side position setting groove and the second one-side position setting groove are eccentric to each other and are in a 180- degree rotational symmetry with each other with reference to a center point of the first lateral surface.

2. The cutting insert of claim 1, wherein the first upper cutting load reducing portion comprises at least one upper one-side nick which is formed on the first upper cutting edge of the upper surface and elongated in a direction toward the second upper cutting edge, and
    the second upper cutting load reducing portion comprises at least one upper other-side nick which is formed on the second upper cutting edge of the upper surface and elongated in a direction toward the first upper cutting edge, wherein
    the at least one upper one-side nick and the at least one upper other-side nick are set in numbers different from each other.

3. The cutting insert of claim 2, wherein the at least one upper one-side nick comprises a first upper one-side nick, and
    the at least one upper other-side nick comprises a first upper other-side nick and a second upper other-side nick, wherein
    when a first imaginary line is drawn from the first upper one-side nick lengthwise to the second upper cutting edge, the first imaginary line is positioned between the first and second upper other-side nicks.

4. The cutting insert of claim 1, further comprising:
    a plurality of lower cutting edges formed between the plurality of lateral surfaces and the lower surface; and
    a first lower cutting load reducing portion and a second lower cutting load reducing portion formed on the lower surface and on sides coming in contact with a first lower cutting edge and a second lower cutting edge among the plurality of lower cutting edges, in which the first and second lower cutting edges are facing each other, so as to reduce cutting load.

5. The cutting insert of claim 4, wherein the first and second upper cutting load reducing portions and the upper surface having the same are in a 180-degree rotational symmetry with the first and second lower cutting load reducing portions and the lower surface having the same, with reference to a center shaft connecting a center point of the first lateral surface with a center point of an opposite surface to the first lateral surface.

6. The cutting insert of claim 1, further comprising an other-side position setting portion formed on a second lateral surface among the plurality of lateral surfaces, in which the second lateral surface is not coming into contact with the first and second upper cutting edges and is opposed to the first lateral surface, so as to set the position of the cutting insert in the coupling part, wherein the other-side position setting portion has an identical shape as a diagonal-symmetric shape of the one-side position setting portion with reference to the center point of the first lateral surface.

7. A milling cutter mounted with a cutting insert of claim 1.

8. A milling cutter mounted with a cutting insert of claim 2.

9. A milling cutter mounted with a cutting insert of claim 3.

10. A milling cutter mounted with a cutting insert of claim 4.

11. A milling cutter mounted with a cutting insert of claim 5.

12. A milling cutter mounted with a cutting insert of claim 6.

* * * * *